United States Patent
Hung et al.

(10) Patent No.: US 9,185,398 B2
(45) Date of Patent: Nov. 10, 2015

(54) METHOD AND APPARATUS FOR PROVIDING THREE-DIMENSIONAL CONTENT

(75) Inventors: Mao-Hsiung Hung, Sugar Hill, GA (US); Rahul R. Sinha, Suwanee, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 1084 days.

(21) Appl. No.: 13/240,688

(22) Filed: Sep. 22, 2011

(65) Prior Publication Data

US 2013/0076877 A1 Mar. 28, 2013

(51) Int. Cl.
*H04N 13/04* (2006.01)

(52) U.S. Cl.
CPC ....... *H04N 13/0425* (2013.01); *H04N 13/0438* (2013.01); *H04N 13/0452* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 4,907,860 A | 3/1990 | Noble | |
| 6,687,399 B1 | 2/2004 | Chuang et al. | |
| 6,724,352 B1 | 4/2004 | Wu | |
| 8,089,507 B2 | 1/2012 | Ikeda et al. | |
| 9,001,191 B2 * | 4/2015 | Kikuchi et al. | 348/51 |
| 2008/0263621 A1 | 10/2008 | Austerlitz et al. | |
| 2010/0194857 A1 * | 8/2010 | Mentz et al. | 348/43 |
| 2011/0134231 A1 | 6/2011 | Hulvey et al. | |
| 2011/0310221 A1 | 12/2011 | Meuninck et al. | |
| 2012/0120212 A1 * | 5/2012 | Mao | 348/56 |
| 2012/0147157 A1 | 6/2012 | Wu et al. | |

FOREIGN PATENT DOCUMENTS

| | | |
|---|---|---|
| EP | 2325686 A1 | 5/2011 |
| WO | 9743681 A1 | 11/1997 |
| WO | 2007024313 A1 | 3/2007 |
| WO | 2010091113 A2 | 8/2010 |
| WO | 2011098936 A2 | 8/2011 |

OTHER PUBLICATIONS

"Wireless 3D Glasses: Maintain Sync Without an IR Transmitter", by HalfBakery.com. Dec. 11, 2002. URL: http://www.halfbakery.com/idea/Wireless_203D_20Glasses.
Product page for VirtualFx 3D TV Converter, URL: http://www.edimensional.com/product_info.php?products_ids=39.
"Using this website to learn how 3D TV works", by Jonathan Strickland, HowStuffWorks.com, a Discovery Channel. Visited Oct. 19, 2010. URL: http://www.howstuffworks.com/3d-tv.htm/printable.

(Continued)

*Primary Examiner* — Geepy Pe (57) ABSTRACT

A system providing three-dimensional content may include a portable multimedia device that generates a composite video signal from 3D content. The portable multimedia device may also generate a synchronization signal for the composite video signal based on an automatic calibration and/or a manual calibration between the portable multimedia device and a display on which the content is to be displayed. The synchronization signal may be transmitted from the portable multimedia device to the active 3D glasses, so that activation of the 3D glasses may be synchronized with content displayed on the display.

20 Claims, 7 Drawing Sheets

(56) References Cited

OTHER PUBLICATIONS

"OpenCable Specifications: Content Encoding Profiles 3.0 Specification", Cable Television Laboratories, Inc. Dated Aug. 27, 2010.
Patent Cooperation Treaty, "PCT Search Report and Written Opinion of the International Searching Authority" for International Application No. PCT/US2012/055314 dated Jan. 25, 2013, 21 pages.
"3D-Crosstalk" Dec. 31, 2010; Retrieved from the Internet: URL:http://burosh.de/technische-informationen/332-3d-crosstalk-testbilder.html; retrieved on Jan. 18, 2013; 10 pages.
Joong Min Ra: A simulation model of 3D crosstalk phenomenon on 3D plasma display with active shutter glasses, Nov. 2011, vol. 57, Issue: 4, all pages.

* cited by examiner

METHOD AND APPARATUS FOR PROVIDING THREE-DIMENSIONAL CONTENT

BACKGROUND

Current active three dimensional (3D) glasses use liquid crystal display (LCD) technology and have infrared (IR) sensors in order to connect the 3D glasses to a television. When showing 3D content on the television, the content shown alternates between two sets of the same image. The two sets are offset from each other and are alternated at such a high rate that if a viewer were to look at the television without 3D glasses, the viewer would appear to see the two sets of images at the same time. The LCD lenses in the 3D glasses alternate between being transparent and opaque as the images alternate on the screen. The left eye lens blacks out when the right eye lens image appears on the television.

Current active 3D glasses are used in conjunction with a 3D-ready television, a stereoscopic sync signal connector, and an IR emitter. However, there are many users who currently do not own 3D-ready televisions that would like to view 3D content without having the burden and cost of upgrading.

Therefore there is a need in the art for a 3D solution for non-3D-ready televisions/monitors.

SUMMARY

A method for providing three-dimensional (3D) content via a portable multimedia device is disclosed. A portable multimedia device generates a composite video signal from 3D content. The portable multimedia device generates a synchronization signal for the composite video signal. The synchronization signal is transmitted from the portable multimedia device to active 3D glasses.

In one embodiment, the composite video signal may be displayed on a display of the portable multimedia device. In one embodiment, the composite video signal is sent to a separate display coupled to the portable multimedia device. The portable multimedia device may be coupled to the separate display via a High Definition Multimedia Interface (HDMI) port.

The synchronization signal may be transmitted using a short range wireless protocol. In one embodiment, the short range wireless protocol is Bluetooth. In one embodiment, the short range wireless protocol is Infrared Data Association-Data (IrDA-Data).

A portable multimedia device for providing three-dimensional (3D) content is disclosed. In one embodiment, a processor is configured to generate a composite video signal from 3D content. The processor is configured to generate a synchronization signal for the composite video signal. A transmitter transmits the synchronization signal from the portable multimedia device to active 3D glasses.

In one embodiment, the portable multimedia device has a display. In this embodiment, the composite video signal is displayed on the display.

In one embodiment, the portable multimedia device sends the composite video signal to a separate display coupled to the portable multimedia device. In this embodiment, the portable multimedia device is coupled to the separate display via a High Definition Multimedia Interface (HDMI) port.

The portable multimedia device may transmit the synchronization signal using a short range wireless protocol. In one embodiment, the short range wireless protocol is Bluetooth. In one embodiment, the short range wireless protocol is Infrared Data Association-Data (IrDA-Data).

A method for automatically calibrating a synchronization signal for three-dimensional (3D) content is disclosed. A first pulse for presenting or rendering as a second pulse by a display device is generated from a portable multimedia device. The second pulse is received by the portable multimedia device. A time difference between transmission of the first pulse and reception of the second pulse is determined by the portable multimedia device. The time difference is used to calibrate the synchronization signal.

In one embodiment, the pulse is an audio pulse or audio signal. In one embodiment, the pulse is a video pulse.

Active three-dimensional (3D) glasses for viewing 3D content on a display are disclosed. A receiver is configured to receive a synchronization signal from a portable media device. A processor uses the synchronization signal to trigger left eye and right eye modes of the active 3D glasses. Active 3D glasses also include at least one short range wireless protocol receiver. The short range wireless protocol receiver may be a Bluetooth receiver. The short range wireless protocol receiver may also be an Infrared Data Association-Data (IrDA-Data) receiver. In one embodiment, active 3D glasses may include two short range wireless protocol receivers, e.g. both Bluetooth and IrDA-Data.

A method for manually calibrating a synchronization signal for three-dimensional (3D) content is disclosed. A video signal is generated. The video signal is sent to a display. The video signal having further characteristics as follows when calibration is achieved: 1) when 3D glasses are off, a top portion of the video signal is a first color, a bottom portion of the video signal is a second color, and a circular area in a center portion of the video signal on the display is a third color, the third color being a combination of the first color and the second color; 2) when 3D glasses are on and the left eye of the user is open and the right eye of the user is closed, a top portion of the video signal is the first color, a bottom portion of the video signal is blank, and a circular area in a center portion of the video signal on the display is the first color; and 3) when 3D glasses are on and the left eye of the user is closed and the right eye of the user is open, a top portion of the video signal is blank, a bottom portion of the video signal is the second color, and a circular area in a center portion of the video signal on the display is the second color.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
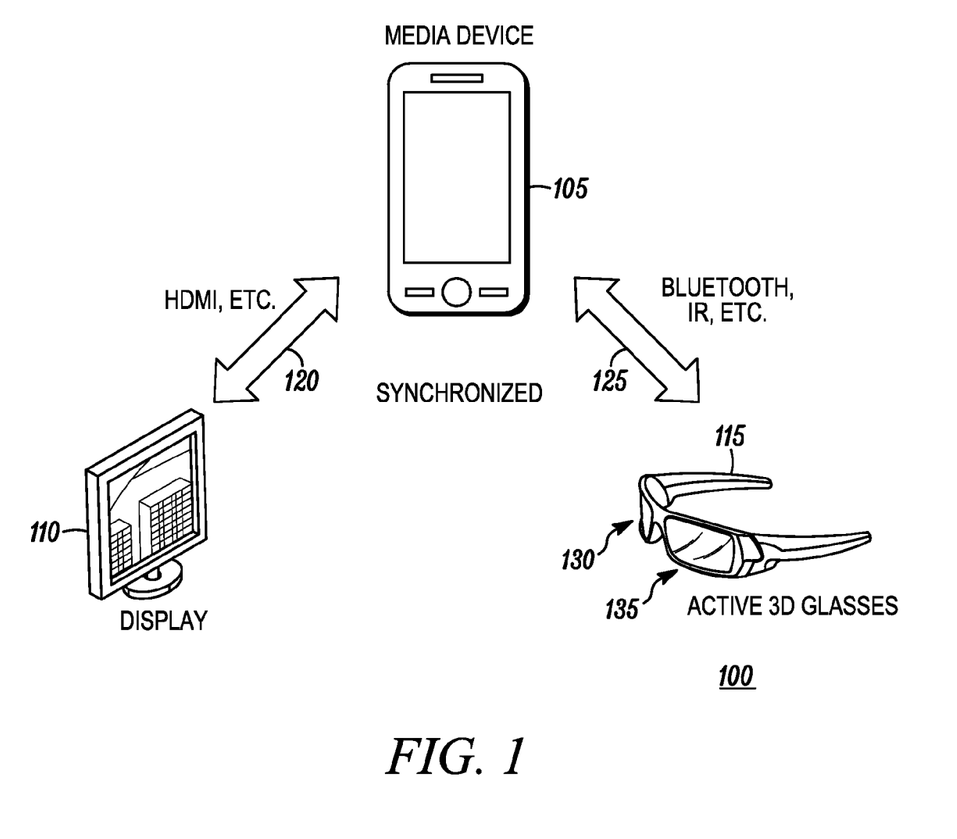
FIG. 1 illustrates a system for displaying 3D content on a non-3D display, according to one embodiment.

FIG. 1 illustrates a system 100 for displaying 3D content on a non-3D TV/display. Media device 105 is coupled to display 110 via link 120 and active 3D glasses 115 via link 125. Link 120 may be any link capable of carrying high definition (HD) content, e.g., a High Definition Multimedia Interface (HDMI). Link 125 may be a short range wireless protocol link. In one embodiment, the short range wireless protocol may be Bluetooth. In another embodiment, the short range wireless protocol may be Infrared Data Association-Data (IrDA-Data). Other possible interfaces in addition to HDMI, Bluetooth and IrDA-Data are: Firewire, ZigBee, component video output, composite video output, S-video, Digital Visual Interface (DVI), Video Graphics Array (VGA), and DisplayPort. The video can also be viewed directly on the media device's screen, if it has one.

Media device 105 composites a 3D content stream into one video stream, with alternating frames for each eye. The composite video stream may be sent to a display of media device 105 or to display 110. Media device 105 transmits a synchronization signal directly to 3D glasses 115 using a short range wireless protocol. The synchronization signal may be sent from media device 105 to active 3D glasses 115 using either a built-in Bluetooth transmitter or an attachable infrared (IR) dongle coupled to media device 105. Likewise, active 3D glasses 115 may have built-in Bluetooth and/or IR receivers.

Active 3D glasses 115 include a left eye lens 135 and a right eye lens 130. The lenses of active 3D glasses 115 are liquid crystal display lenses.

Figure 2:
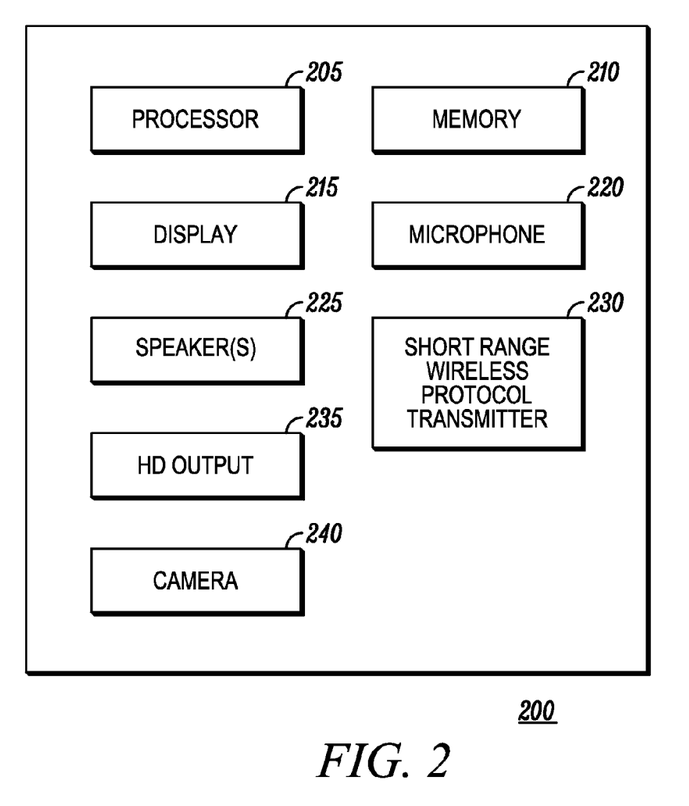
FIG. 2 illustrates a media device, according to one embodiment.

FIG. 2 illustrates a media device 200 according to one embodiment. Media device 200 may be a personal digital assistant (PDA) or mobile device, e.g., a laptop, netbook, tablet, portable media device, smart phone, or wireless phone. Media device 200 includes processor 205, memory 210, display 215, microphone 220, one or more speakers 225, short range wireless protocol transmitter 230, HD output 235, and camera 240. Using processor 205, media device 200 retrieves 3D content from memory 210. Media device 105, 200 composites a 3D content stream into one video stream, with alternating frames for each eye of a user wearing active 3D glasses, e.g. active 3D glasses 115. Media device 105, 200 may display the composite video stream on display 215 or send the composite video stream to an external display, e.g. display 110, via HD output 235. HD output 235 may be an HDMI interface or any other interface capable of transmitting HD content. Theoretically aspects of the present disclosure will work on any display, however video quality will be degraded due to slow refresh rates of most CRTs. Aspects of the present disclosure can also work on a PC monitor provided a proper software driver is installed.

Media device 105, 200 generates a synchronization signal for the composite video signal, e.g. composite video stream. This synchronization signal is sent to active 3D glasses 115. The synchronization signal received from media device 105, 200, processor 305 is used by active 3D glasses 115 to trigger left eye and right eye modes in order to view the composite video stream.

Media device 105, 200 may also be used to calibrate a synchronization signal for the composite video stream. This calibration may be automatic or manual.

When media device 105, 200 is used to automatically calibrate the synchronization signal, a pulse is generated from the portable multimedia device, e.g. media device 200, and transmitted to display device 110. Display device 110 presents or renders the pulse. The presented or rendered pulse is received by media device 105, 200. A time difference between transmission of the generated pulse and receipt of the presented or rendered pulse is determined. The time difference is used by media device 105, 200 to calibrate the synchronization signal.

In one embodiment, when media device 105, 200 is used to automatically calibrate the synchronization signal, an audio signal or pulse is generated from a portable multimedia device, e.g. media device 200, for rendering from a speaker coupled to a display device 110. The speaker is coupled to display 110. The coupled speaker may be attached or external to display 110. The rendered audio signal is received via microphone 220 on portable multimedia device 200. A time difference between transmission of the audio signal by the speaker coupled to the display device and reception of the audio signal by the microphone of the portable multimedia device is determined. The time difference is used to calibrate the synchronization signal.

In one embodiment, when media device 105, 200 is used to automatically calibrate the synchronization signal, a video pulse is generated from the portable multimedia device, e.g. media device 200, and transmitted to display device 110. Display device 110 presents the video pulse. The presented pulse is received by media device 105, 200. In one embodiment, the presented pulse is received by camera 240. A time difference between transmission of the generated video pulse and receipt of the presented video pulse is determined. The time difference is used by media device 105, 200 to calibrate the synchronization signal.

Figure 3:
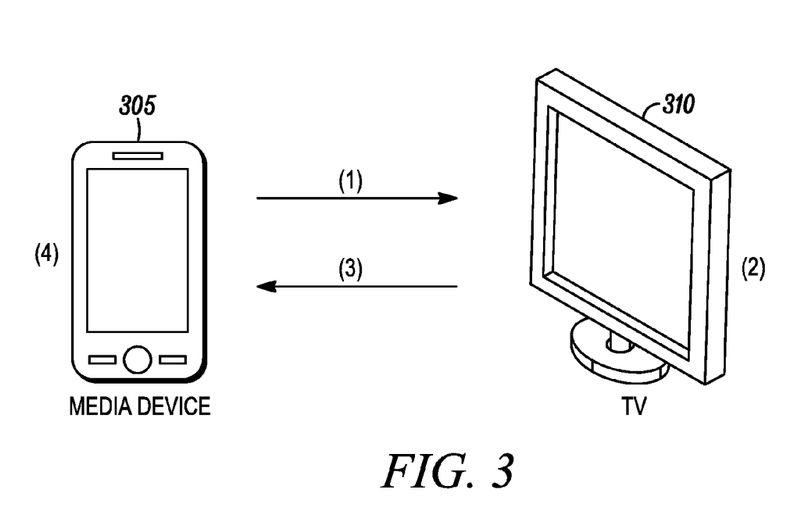
FIG. 3 illustrates a process for determining a signal travel time, according to one embodiment.

FIG. 3 illustrates an exemplary method of determining a time difference, e.g. a "round trip time". Media device 105, 200, 305 starts a timer and sends a sync pulse to TV 110, 310. Item (1) represents the amount of time it takes the signal to reach the TV. Item (2) represents the processing delay on TV 310 before the pulse is rendered. Item (3) represents the amount of time it takes for the rendered pulse to reach back to media device 305. Item (4) represents the processing delay on media device 305 before the timer is stopped. The time measured by the timer is the round-trip time (item (1)+item (2)+item (3)) plus a predictable processing delay, item (4) on media device 305. The actual round-trip can be determined by subtracting the media-device processing delay from the timer value. This round-trip time represents the delay that the media device must put in between sending the 3D audio/video frames to TV 310 and emitting the sync signal to glasses, e.g. 3D glasses 115, 400. The above sequence can automatically be repeated by media device 305 to determine a more accurate round-trip time.

When media device 200 is used to manually calibrate the synchronization signal, a video signal is generated from media device 200. The video signal is sent to display 110, where a top portion of the video signal is a first color, e.g. blue, and a bottom portion of the video signal is a second color, e.g. red, and the two colors appear exclusively in alternating frames. Calibration is achieved when the following occurs: 1) When a user is not wearing 3D glasses, i.e., the 3D glasses are off and both (left and right) eyes of a user are open, a circular portion in a center portion of the video signal on display 110 is a third color (A combination of the top and bottom colors), e.g. purple; 2) When 3D glasses are on and the left eye of the user is open and the right eye of the user is closed, the circular area in the center portion of the video signal on the display is the first color and the bottom color disappears from the screen; and 3) When 3D glasses are on and the left eye of the user is closed and the right eye of the user is open, the circular area in the center portion of the video signal on the display is the second color and the top color disappears from the screen. The user will use buttons (hard or soft (e.g., via a touchscreen display of media device 105, 200)) to vary the delay between sending the video signal to the display 110 and emitting the sync signal to the glasses 115 in increments determined by the media device 105 based on the frame rate of the video. When the delay is perfectly in sync, the circular area should blend in seamlessly with either the top or bottom color when the corresponding eye is closed and the glasses 115 are on.

Figure 4:
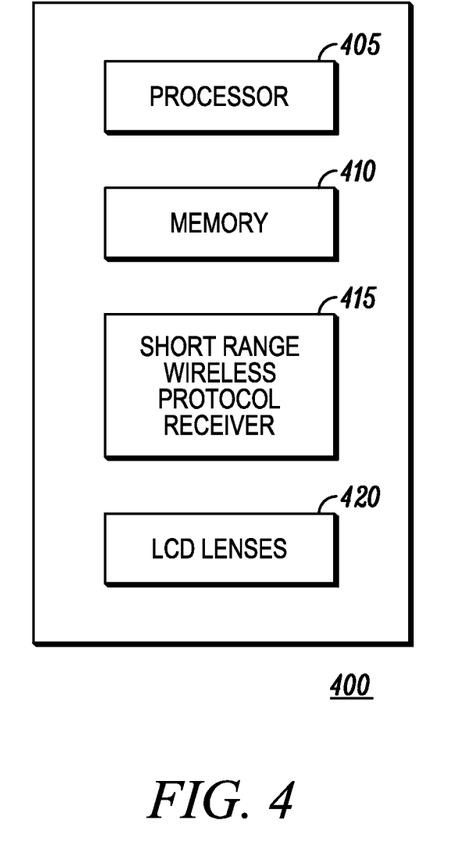
FIG. 4 illustrates a set of active 3D glasses, according to one embodiment.

FIG. 4 illustrates active 3D glasses 400. Active 3D glasses 400 include processor 405, memory 410, short range wireless protocol receiver 415, and LCD lenses 420. LCD lenses 420 include a left eye lens 135 and a right eye lens 130. Using a synchronization signal received from media device 105, 200, processor 405 uses the synchronization signal to trigger left eye and right eye modes of active 3D glasses 115, 400. LCD lenses 420 in active 3D glasses 115, 400 alternate between being transparent and opaque as the images alternate on the screen. Left eye lens 135 blacks out when the right eye lens image appears on the television. Likewise, right eye lens 130 blacks out when the left eye lens image appears on television 105, 110, 200. The synchronization signal may be received via short range wireless protocol receiver 415. Short range wireless protocol receiver 415 may be a Bluetooth receiver or an IrDA-Data receiver. Active 3D glasses 400 may include more than one type of short range wireless protocol receiver.

Figure 5:
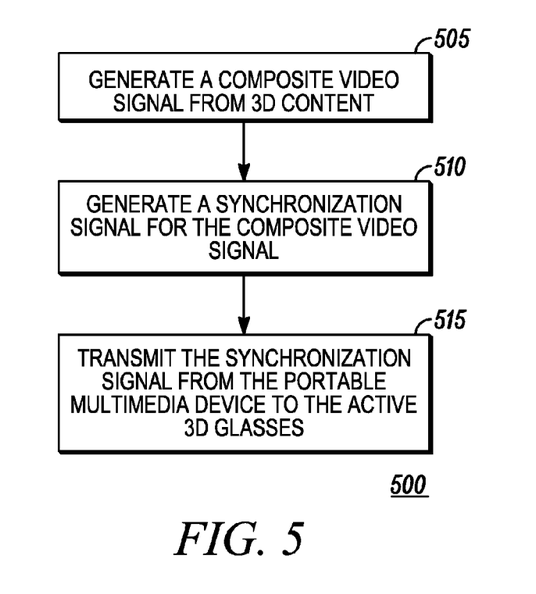
FIG. 5 illustrates a method for providing 3D content via a portable multimedia device, according to one embodiment.

FIG. 5 illustrates a method 500 for providing three-dimensional (3D) content via a portable multimedia device. At step 505, a composite video signal is generated from 3D content. The 3D content may be stored in a memory 210 of portable media device 105, 200. The composite video signal may be generated using rearrangement and upconversion processing as disclosed in OpenCable—Current Encoding Profiles 3.0 Specification. In one embodiment, 3D content may be downloaded to the portable multimedia device 105, 200 pre-composited into a video stream to save processing power.

At step 510, a synchronization signal is generated for the composite video signal. At step 515, the synchronization signal is transmitted from portable multimedia device 105, 200 to active 3D glasses 115, 400.

Figure 6:
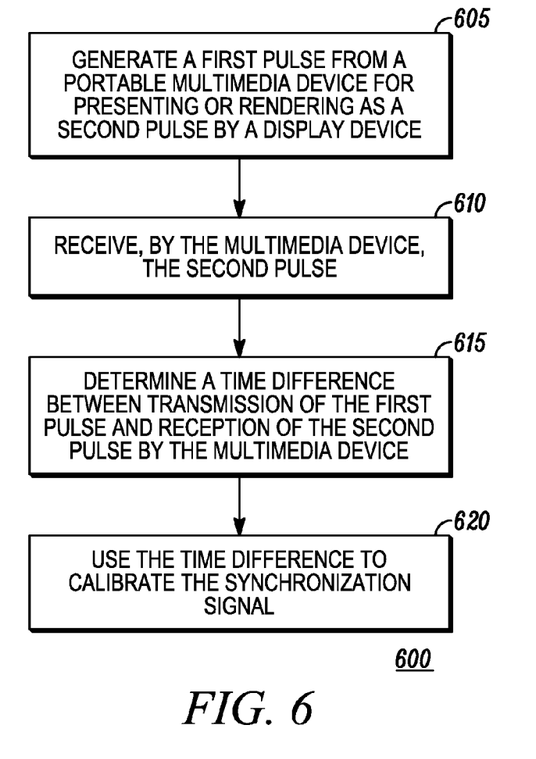
FIG. 6 illustrates a method for automatically calibrating a synchronization signal, according to one embodiment.

FIG. 6 illustrates method 600 for automatically calibrating a synchronization signal for three-dimensional (3D) content. This automatic synchronization works by having portable multimedia device 105, 200 transmit a pulse to a television, e.g. display 110 at a pre-determined rate (e.g., 100 pulses per second) and using the portable multimedia device 105, 200 to measure a length of time display 110 takes to process and output the pulses that are being received from portable multimedia device 105, 200.

At step 605, a first pulse is generated from a portable multimedia device for presenting or rendering as a second pulse by a display device. In one embodiment, the first pulse is sent to display 110 via interface 120 and may be an audio pulse rendered from speakers coupled to display 110 or a video pulse presented on display 110.

At step 610, the second pulse, e.g. the presented or rendered pulse, is received by the multimedia device. In one embodiment, the second pulse is a rendered audio pulse that is received via microphone 220 on portable multimedia device 105, 200. In one embodiment, the second pulse is a presented video pulse that is received via camera 240 on portable multimedia device 105, 200.

At step 615, a time difference between transmission of the first pulse and reception of the second pulse by portable multimedia device 105, 200 is determined. At step 620, the time difference is used to calibrate the synchronization signal. The time difference is used to determine how far display 110 is from media device 105, 200 and the processing delay introduced by display 110 before content is presented by display 110. Knowing the processing delay and the distance of display 110 from media device 105, 200 allows for calculation of an amount of time to delay sending of the sync signal. This is important because the sync signal must reach glasses 400 at the exact same time as the picture from display 110 hits the glasses.

Figure 7:
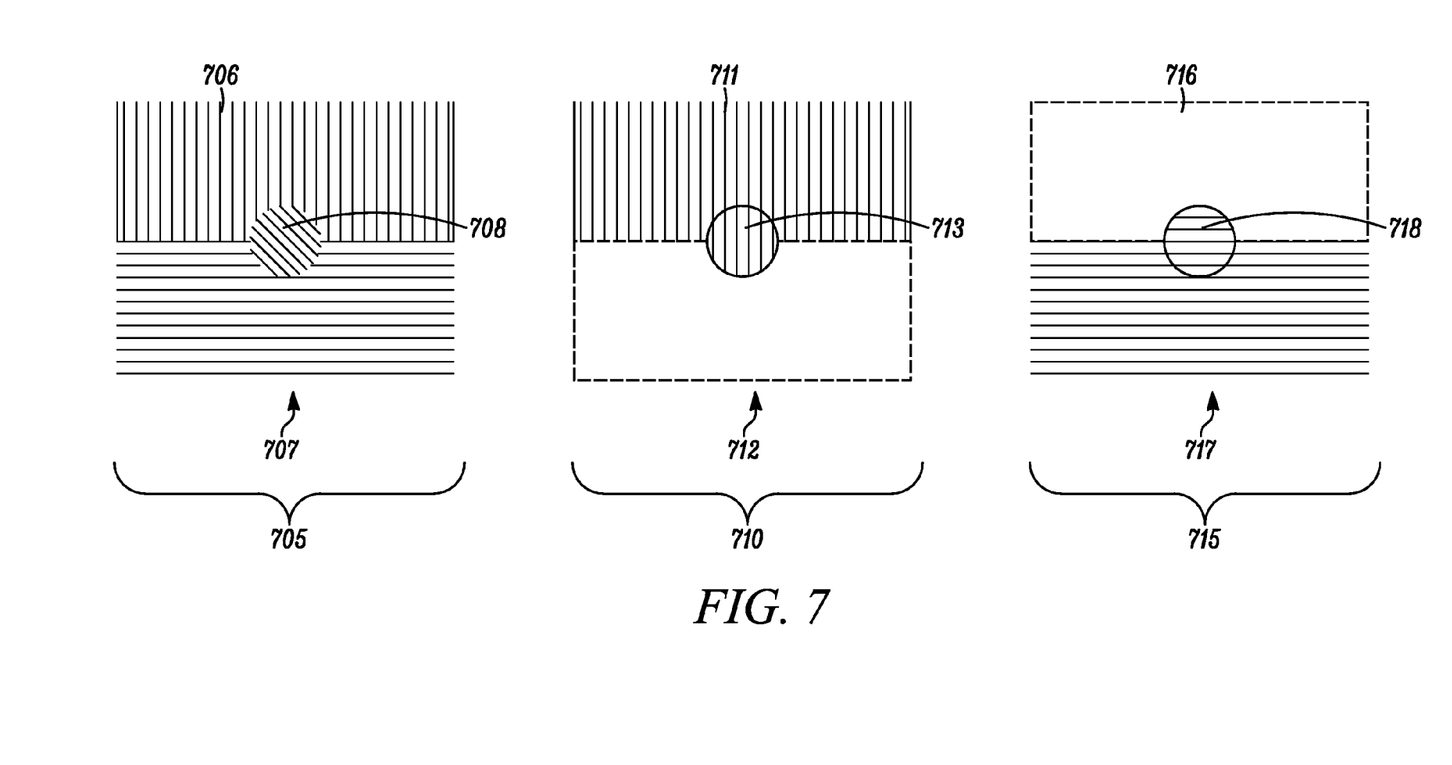
FIG. 7 is a diagram of a manual calibration of a synchronization signal.

FIG. 7 illustrates a diagram of a manual calibration of a synchronization signal. Diagrams 705, 710, 715 represent what is seen by a user on display 110 when manual calibration is achieved. Diagram 705 illustrates a video signal displayed on display 110. Diagram 705 represents what is seen by a user without wearing 3D glasses. A top portion 706 remains a first color for only the left eye frame and remains blank for the right eye frame (in this embodiment, vertical lines represent the color blue). A bottom portion 707 remains a second color for only the right eye frame and remains blank for the left eye frame (in this embodiment, horizontal lines represent the color red). A circular area 708 in the center of the video signal is the first color for the left eye frame and is the second color for the right eye frame. The combination of these left eye frame and right eye frame when viewed without 3D glasses causes the user to perceive the circular area 708 as a homogenous mixture of the top and bottom colors, i.e., if the top color is blue and the bottom color is red, their mixture will be purple.

Diagram 710 illustrates a video signal displayed on display 110. Diagram 710 represents what is seen by a user while wearing 3D glasses for the left eye frame, i.e., having the left eye open while the right eye is closed and the sync delay has been perfectly adjusted manually. A top portion 711 is a first color for the left eye frame (in this embodiment, vertical lines represent the color blue). A bottom portion 712 is blank. The circular area 713 in the center of the video signal is the first color (in this embodiment, the circular area is blue).

Diagram 715 illustrates a video signal displayed on display 110. Diagram 715 represents what is seen by a user while wearing 3D glasses for the right eye frame, i.e., having the right eye open while the left eye is closed and the sync delay has been perfectly adjusted manually. A top portion 716 is blank. A bottom portion 717 is a second color for the right eye frame (in this embodiment, horizontal lines represent the color red). The circular area 718 in the center of the video signal is the second color (in this embodiment, the circular area is red).

Figure 8:
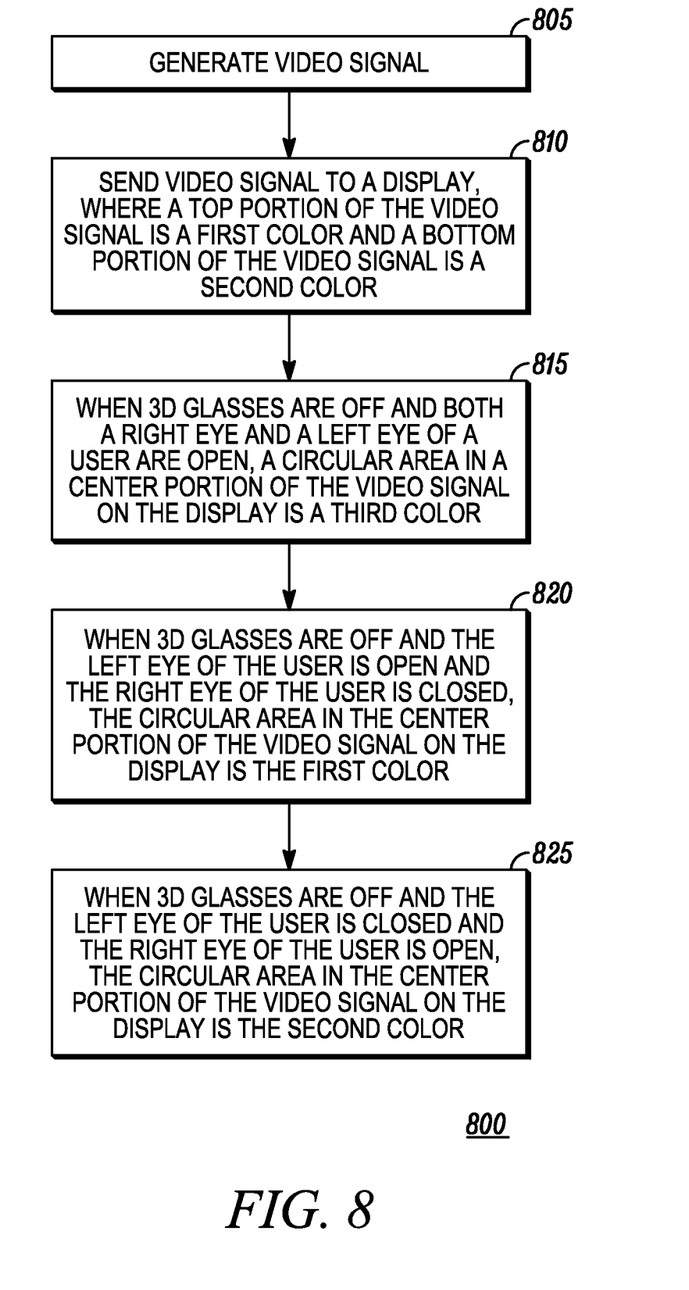
FIG. 8 illustrates a method for manually calibrating a synchronization signal, according to one embodiment.

FIG. 8 illustrates a method 800 for manually calibrating a synchronization signal. At step 805, a video signal is generated. At step 810, the video signal is sent to display 110, where a top portion 706, 711, 716 of the video signal is a first color and a bottom portion 707, 712, 717 of the video signal is a second color. At step 815, when 3D glasses are off and both a right eye and a left eye of a user are open, a circular area 708 in a center portion of the video signal on display 110 is a third color. At step 820, when 3D glasses are on, the left eye of the user is open, and the right eye of the user is closed, the circular area 713 in the center portion of the video signal on display 110 is the first color. At step 825, when 3D glasses are on, the left eye of the user is closed, and the right eye of the user is open, the circular area 718 in the center portion of the video signal on display 110 is the second color.

Figure 9:
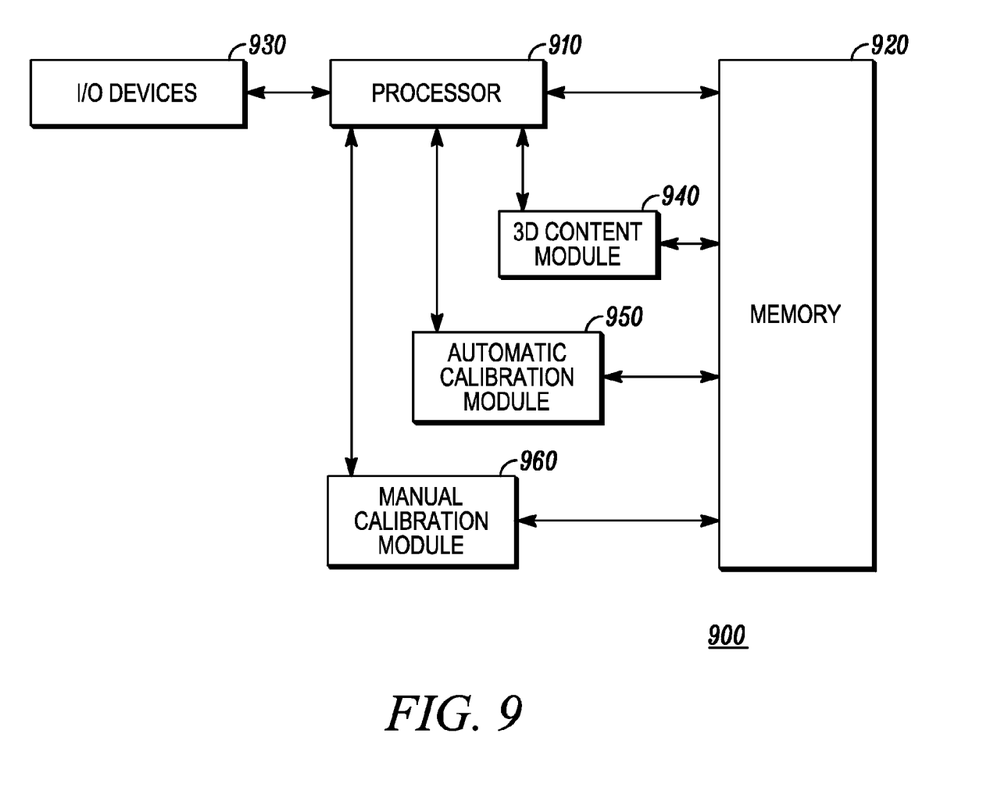
FIG. 9 is a block diagram of an example device, according to an embodiment.

FIG. 9 illustrates a block diagram of an example device 900. Specifically, device 900 can be employed to provide 3D content using 3D content module 940. Also, device 900 may be used to automatically calibrate a synchronization signal for 3D content using automatic calibration module 950. In addition, device 900 may be used to manually calibrate a synchronization signal for 3D content using manual calibration module 960. Device 900 may be implemented in portable media device 105, 200.

Device 900 comprises a processor (CPU) 910, a memory 920, e.g., random access memory (RAM) and/or read only memory (ROM), 3D content module 940, automatic calibration module 950, manual calibration module 960, and various input/output devices 930, (e.g., storage devices, including but not limited to, a tape drive, a floppy drive, a hard disk drive or a compact disk drive, a receiver, a transmitter, network attached storage, speaker(s), a microphone, a camera, and other devices commonly required in multimedia, e.g. content delivery, system components).

It should be understood that 3D content module 940, automatic calibration module 950, and manual calibration module 960 can be implemented as one or more physical devices that are coupled to the CPU 910 through a communication channel. Alternatively, 3D content module 940, automatic calibration module 950, and manual calibration module 960 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 920 of the computer. As such, 3D content module 940, automatic calibration module 950, and manual calibration module 960 (including associated data structures) of the present invention can be stored on a computer readable medium, e.g., RAM memory, magnetic or optical drive or diskette and the like.

The processes described above, including but not limited to those presented in connection with FIGS. 3, 5, 6, and 8, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium, e.g. a non-transitory computer-readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

While the foregoing is directed to embodiments of the present invention, other and further embodiments of the invention may be devised without departing from the basic scope thereof, and the scope thereof is determined by the claims that follow.

What is claimed is:

1. A method for providing three-dimensional (3D) content via a portable multimedia device, comprising:
   generating, by the portable multimedia device, a composite video signal from 3D content;
   determining, by the portable multimedia device, a time difference corresponding to displaying the 3D content on a display device and controlling active 3D glasses, the time difference being determined based on a first calibration and a second calibration, the first calibration being performed independent of user interaction and the second calibration being based on user interaction with the active 3D glasses, the second calibration including:
   generating a video signal; and
   sending the video signal to the display,
      upon completion of the second calibration:
         when the active 3D glasses are off, a first portion of the video signal on the display is a first color, a second portion of the video signal on the display is a second color, and a third portion of the video signal including a section of the first portion and a section of the second portion of the video signal on the display is a third color,
         when the active 3D glasses are on and in a left eye mode, the first portion of the video signal on the display is the first color, the second portion of the video signal on the display is blank, and the third portion of the video signal on the display is the first color, and
         when the active 3D glasses are on and in a right eye mode, the first portion of the video signal on the display is blank, the second portion of the video signal on the display is the second color, and the third portion of the video signal on the display is the second color;
   generating, by the portable multimedia device, a synchronization signal configured to trigger the left eye and right eye modes of the active 3D glasses corresponding to displaying the composite video signal on the display device, the synchronization signal being based on the 3D content and the time difference; and
   transmitting the synchronization signal from the portable multimedia device to the active 3D glasses.

2. The method of claim 1, further comprising displaying the composite video signal on the display of the portable multimedia device, wherein the portable multimedia device includes the display.

3. The method of claim 1, further comprising sending the composite video signal to the display, wherein the display is communicatively coupled to the portable multimedia device.

4. The method of claim 3, wherein the portable multimedia device is communicatively coupled to the separate display via a High Definition Multimedia Interface (HDMI) port.

5. The method of claim 1, wherein the synchronization signal is transmitted using a short range wireless protocol.

6. The method of claim 5, wherein the short range wireless protocol is a short-wavelength wireless protocol.

7. The method of claim 5, wherein the short range wireless protocol is a wireless infrared protocol.

8. A portable multimedia device for providing three-dimensional (3D) content, comprising:
   a processor configured to:
      generate a composite video signal from 3D content,
      determine a synchronization calibration corresponding to displaying the 3D content on a display and controlling active 3D glasses, the synchronization calibration including a first calibration and a second calibration based on a displayed image corresponding to a mode associated with the active 3D glasses,
      upon completion of the second calibration:
         when the active 3D glasses are off, a first portion of a video signal on the display is a first color, a second portion of the video signal on the display is a second color, and a third portion of the video signal including a section of the first portion and a section of the second portion of the video signal on the display is a third color, when the active 3D glasses are in a left eye mode, the first portion of the video signal displayed on the display is the first color, the second portion of the video signal is blank, and the third portion of the video signal on the display is the first color, and when the active 3D glasses are in a right eye mode, the first portion of the video signal on the display is blank, the second portion of the video signal on the display is the second color, and the third portion of the video signal on the display is the second color, and generate a synchronization signal configured to trigger the left eye and right eye modes of the active 3D glasses corresponding to displaying the composite video signal on the display, the synchronization signal being based on the 3D content and the synchronization calibration; and a transmitter that transmits the synchronization signal from the portable multimedia device to active 3D glasses.

9. The portable multimedia device of claim 8, wherein the portable multimedia device includes the display, and the composite video signal is displayed on the display.

10. The portable multimedia device of claim 8, wherein the display is separate from the portable multimedia device communicatively coupled to the portable multimedia device, and the portable multimedia device sends the composite video signal to the display.

11. The portable multimedia device of claim 10, wherein the portable multimedia device is coupled to the display via a High Definition Multimedia Interface (HDMI) port.

12. The portable multimedia device of claim 8, wherein the synchronization signal is transmitted using a short range wireless protocol.

13. The portable multimedia device of claim 12, wherein the short range wireless protocol is a short-wavelength wireless protocol.

14. The portable multimedia device of claim 12, wherein the short range wireless protocol is a wireless infrared protocol.

15. The method of claim 1, wherein the first calibration includes, generating a first pulse from the portable multimedia device for presenting or rendering as a second pulse by the display, receiving, by the portable multimedia device, the second pulse, and determining the time difference based on a transmission of the first pulse and a reception of the second pulse by the portable multimedia device.

16. The method of claim 15, wherein the first pulse is an audio pulse or audio signal.

17. The method of claim 15, wherein the first pulse is a video pulse.

18. The method of claim 1, wherein, in the second calibration, when the active 3D glasses are off, the first portion of the video signal is a top portion of the video signal on the display, the second portion of the video signal is a bottom portion of the video signal on the display, the third portion of the video signal is a circular area in a center portion of the video signal on the display, and the third color is a combination of the first color and the second color.

19. A method for providing three-dimensional (3D) content via a portable multimedia device, comprising:

generating, by the portable multimedia device, a composite video signal from 3D content;

including a first calibration based on a first pulse transmitted by the portable multimedia device and a second pulse received by the portable multimedia device, and a second calibration based on a video imaged displayed on the display, upon completion of the second calibration, when the active 3D glasses are off, a first portion of the video signal on the display is a first color, a second portion of the video signal on the display is a second color, and a third portion of the video signal overlapping the first and second portions of the video signal is a third color, in a left eye mode, the first portion of the video signal is the first color, the second portion of the video signal is blank, and the third portion of the video signal is the first color, and in a right eye mode, the first portion of the video signal is blank, the second portion of the video signal is the second color, and the third portion of the video signal is the second color;

generating, by the portable multimedia device, a synchronization signal configured to trigger the left eye and right eye modes of active 3D glasses corresponding to displaying the composite video signal on the display device, the synchronization signal being based on the 3D content and the time difference; and transmitting the synchronization signal from the portable multimedia device to the active 3D glasses.

20. A portable multimedia device for providing three-dimensional (3D) content, comprising:

a processor configured to:

generate a composite video signal from 3D content, including a first calibration based on a first pulse transmitted by the portable multimedia device and a second pulse received by the portable multimedia device, and a second calibration based on a video image displayed on the display, upon completion of the second calibration, when the active 3D glasses are off, a first portion of the video signal on the display is a first color, a second portion of the video signal on the display is a second color, and a third portion of the video signal overlapping the first and second portions of the video signal is a third color, in a left eye mode, the first portion of the video signal is the first color, the second portion of the video signal is blank, and the third portion of the video signal is the first color, and in a right eye mode, the first portion of the video signal is blank, the second portion of the video signal is the second color, and the third portion of the video signal is the second color, and generate a synchronization signal configured to trigger the left eye and right eye modes of the active 3D glasses corresponding to displaying the composite video signal on the display, the synchronization signal being based on the 3D content and the synchronization calibration; and a transmitter that transmits the synchronization signal from the portable multimedia device to active 3D glasses.

* * * * *